PAUSE CONTROL FOR PHONOGRAPH DRIVING MECHANISM

Filed May 17, 1963

INVENTOR.
LEON J. ABLON
BY [signature]
ATTORNEY

United States Patent Office 3,229,539
Patented Jan. 18, 1966

3,229,539

PAUSE CONTROL FOR PHONOGRAPH DRIVING MECHANISM

Leon J. Ablon, Alfred, N.Y., assignor to Graflex, Inc., Rochester, N.Y., a corporation of New York Filed May 17, 1963, Ser. No. 281,229
6 Claims. (Cl. 74—209)

Figure 1:
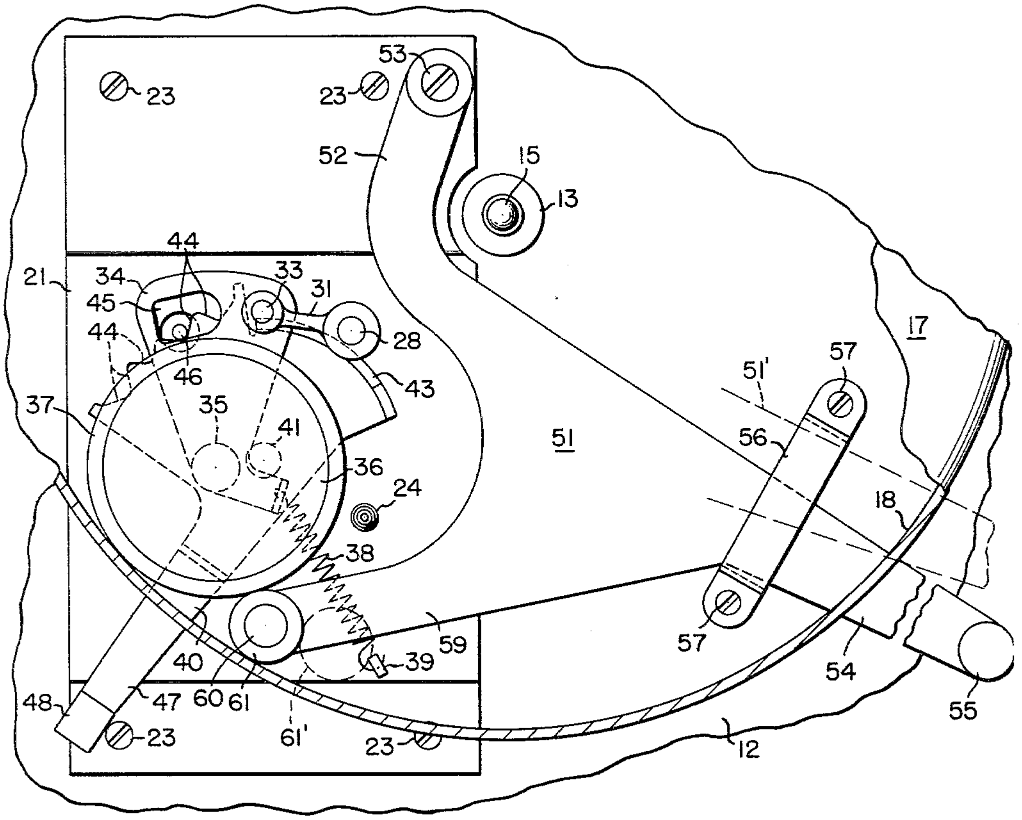

This invention relates to a phonograph driving mechanism, and more particularly, to a device for controlling the pauses in the rotation of a phonograph turntable of the type employed in an audio-projector unit. More specifically the invention relates to mechanism for stopping rotation of the record player of a picture-record player device designed to show still pictures with associated synchronized sound commentary.

It is commonplace today to employ audio-projectors to show still or motion pictures together with synchronized sound commentary. Normally such devices utilize a variable speed record player for producing an audible commentary in synchronization with the associated film projector. In practice, these devices are employed in the presentation of "canned" messages by salesmen, teachers, lecturers and the like, who often find it necessary to interrupt the program periodically to elaborate upon specific points. However, heretofore none of these devices have had satisfactory means for permitting the program to be halted without losing precise synchronization between the projector and the record player. The reason for this is that, when conventional means are employed the turntable does not stop instantaneously, but tends to rotate beyond the desired stopping point before it finally comes to a halt. When records containing automatic trip signals are being used, this tendency may be disastrous since in the interval before the table is actually stopped the turntable may drift through or beyond the next trip signal, therefore causing a loss of synchronization between the projector and record player.

One object of this invention is to provide an improved drive mechanism for a combination projector-record player unit, with which the turntable and a record thereon can be stopped instantaneously and without lifting the cartridge from the record.

Another object of this invenion is to provide a control device for stopping the record player of a combination projector-record player unit without disturbing the synchronization between the projector and the record player.

A further object of this invention is to provide improved means for stopping the turntable of a combination projector-record player instantaneously, which will enable the turntable to start rotating again instantaneously.

Other objects of the invention will be apparent hereinafter from the specification, and from the recital of the amended claims, particularly when read in conjunction with the accompanying drawing.

Figure 2:
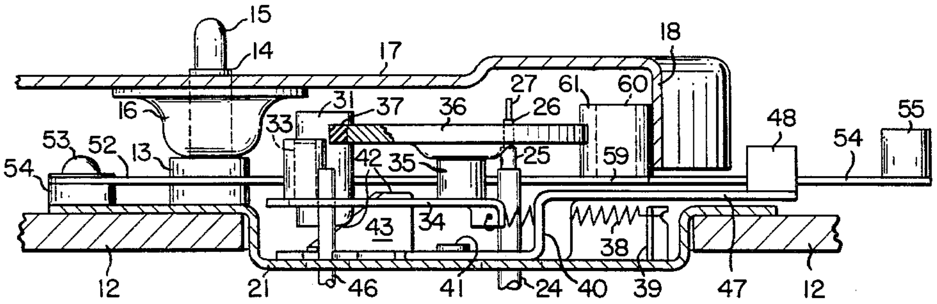

In the drawing:

FIG. 1 is a horizontal sectional view of a phonograph turntable and of the drive mechanism therefor made in accordance with one embodiment of this invention, the top of the turntable being cut away to illustrate part of the drive mechanism therebeneath; and FIG. 2 is a fragmentary side view of the mechanism looking at the left side thereof as shown in FIG. 1, portions of the mechanism being shown in section.

Referring now to the drawing by numerals of reference, 12 designates a support which carries a central boss 13 with which a cylindrical post 14 (FIG. 2) is integral. The upper end of post 14 is of reduced diameter and forms a centering pin 15 which is adapted to project into the center hole of a phonograph record (not illustrated).

Mounted on boss 13 and surrounding the post 14 is a rotatable cup bearing 16 (FIG. 2) to which a conventional turntable 17 is secured. Turntable 17 has a downwardly depending annular flange 18 around its outer marginal edge.

Suspended in an opening in plate 12 adjacent the bearing 13 is a plate or bracket 21 which is secured by screws 23 (FIG. 1) to the upper face of plate 12. Projecting upwardly through an opening in the bracket 21, and into the space beneath the turntable 17, is a rotatable drive spindle 24 which is adapted to be driven in a conventional manner by a motor (not illustrated) mounted beneath the plate 12. Adjacent its upper end the diameter of the spindle 24 is reduced in three successive stages as denoted at 25, 26 and 27, respectively, in FIG. 2, so that the spindle provides a conventional four speed drive member.

Axially slidable on a pin 28 fixed to the upper face of bracket 21 is one end of a vertically movable link 31 (FIG. 1). Link 31 has its opposite end, which is of reduced height as compared to its other end, pivotally connected to a pin 33 carried by an adjustable, bell-crank shaped, horizontally disposed clutch plate 34. Secured to the upper face of plate 34, and projecting upwardly therefrom parallel to spindle 24 is a shaft 35. Rotatably mounted on the upper end of shaft 35 is a drive wheel 36 which has a resilient rubber ring 37 secured around its periphery. Ring 37 has its peripheral surface disposed in frictional engagement with the inner surface of the turntable flange 18 as shown in FIG. 1. A tension spring 38 has one end thereof connected to the short arm of the plate 34, and at its opposite end is secured to a lug 39 which projects upwardly from the bottom of the bracket 21. The spring 38 tends constantly to pivot the plate 34 and its pin 33 in a counterclockwise direction in FIG. 1.

Mounted to pivot intermediate its ends about a stationary, cylindrical stud 41, which projects upwardly from the upper face of bracket 21 beneath the plate 34, is a speed selection lever 40. Part of one end of lever 40 has thereon an arcuate flange 43 which projects upwardly and which has an active surface that is shaped to four steps or flats 42 (FIG. 2). Gravity constantly urges link 31 axially downwardly on pin 28 so that the upper, stepped edge of flange 43 constantly engages the lower surface of the larger end of the link 31.

The remaining part of this end of lever 40 adjacent the flange 43 is provided with four, angularly-spaced, radial notches 44 (FIG. 1).

Projecting loosely through an opening in bracket 21, and extending upwardly therefrom is a pin 46. Pin 46 is adapted to be engaged selectively in one of the notches 44 in the lever 40, and to pass through an opening 45 (FIG. 1) in the plate 34. Pin 46 is constantly urged by a spring (not shown) radially inwardly into one of the notches 44 in the lever 40 to hold the lever in one of its four positions of angular adjustment about the stud 41. Lever 40 has an integral handle portion 47, which extends outwardly beyond the flange 18 of the turntable 17, and which is provided with a finger grip 48 for manually shifting it into one of its four positions.

The mechanism as thus far described is that of a conventional, four-speed phonograph.

The novel pause control mechanism of the present invention comprises a three armed lever 51 which is mounted to pivot in the space between the plate 12 and the turntable 17. Lever 51 has a first arm 52 which is mounted at one end by means of a screw 53 and a spacer 54 (FIG. 2), to plate 12 for pivotal movement about an axis which extends parallel to the axis of rotation of the wheel 36. Lever 51 has a second arm 54 which extends outwardly beneath the flange 18, and terminates in a knob 55 for manually pivoting the lever 51 in a horizontal plane about the screw 53. The arm 54 of lever 51 passes through an inverted, generally U-shaped keeper 56 (FIG. 1), which is secured by screws 57 to the upper face of plate 12 beneath the turntable 17. Keeper 56 limits the pivotal movement of the lever 51 between its extreme counterclockwise direction shown in broken lines at 51' in FIG. 1, and its active position in which it is shown in solid lines in this figure.

The third arm 59 of lever 51 extends outwardly from the center of lever 51, and is provided with a stud 60 on which is rotatably mounted a resilient rubber roller 61 which is positioned simultaneously to engage the peripheral surface of the resilient ring 37 on wheel 36 and the inner surface of the turntable flange 18, when the lever 51 is pivoted into its solid line position shown in FIG. 1. This is its active braking position; and in this position it stops frictionally and simultaneously both wheel 36 and turntable 17. When the lever 51 is disposed in its inactive position, the braking member 61 is moved to its broken line position as shown at 61' in FIG. 1, wherein it becomes disengaged from both the wheel 36 and the turntable flange 18.

In use, and assuming that the lever 51 is in its inactive or broken line position as shown in FIG. 1, the handle 47 of the speed selector lever 40 is manipulated to pivot the latter to engage pin 46 selectively in one of the four notches 44 in the lever. The pivoting of lever 40 causes its flange 43 to produce a corresponding raising or lowering of link 31, depending upon whether the lever 40 is pivoted in a counterclockwise or clockwise direction, respectively, relative to its position shown in FIG. 1. As the link 31 is shifted vertically on pin 28, it causes a corresponding vertical shifting of the plate 34 secured to link 31 so that the resilient peripheral surface of the ring 37 on the drive wheel 36 will be positioned in alignment with the normal periphery, or one of the steps formed on the periphery of spindle 24. Since the lever arm 51 is in its inactive position, the tension spring 38 causes the plate 34 to be pivoted in a counterclockwise direction in FIG. 1 so that the wheel 36 carried thereby will have its periphery frictionally engaged with both the annular turntable flange 18 and that step on the spindle 24 with which the wheel 36 happens to be aligned. Hence, the spindle 24 will drive the wheel 36, which in turn will rotate the turntable 17. The operation as thus far described is quite conventional.

If it be desired to halt the rotation of the turntable 17 during the course of a lecture or the like, say, to further explain a particular subject or term, the arm 54 of lever 51 is moved clockwise from its broken line position to its solid line position in FIG. 1, therefore causing the arm 59 to engage the brake roller 61 simultaneously with the resilient, outer surface of the wheel 36 and the inside surface of the turntable flange 18. As the brake roller 61 is urged against the wheel 36 it forces the latter in a direction away from the spindle 24 to the position shown in FIG. 1, thus simultaneously braking the turntable 17 and interrupting the drive between the spindle 24 and the wheel 36 without having to stop the rotation of the spindle 24. The spindle 24 continues to rotate, and when it is desired once again to actuate the phonograph, the lever 51 is pivoted back to its inactive position, thereby moving the brake 61 to its broken line position in FIG. 1 so that the turntable is once again released, and so that the wheel 36 may once again engage the rotating spindle 24 to be driven thereby.

From the foregoing it will be apparent that applicant has provided a relatively simple and inexpensive means for interrupting the operation of a phonograph used in conjunction with a projector, without having to worry about loss of synchronization between the phonograph and projector. With applicant's braking device there is no need to interrupt the rotation of spindle 24. Hence, when the wheel 36 once again engages the spindle 24 after a pause, the turntable starts up immediately with an acceleration which is extremely high as compared to what it would be if the spindle 24 had been stopped during the pause. Moreover, the brake 61 upon being moved to its operative position simultaneously engages and brakes both the idler wheel 36 and the turntable 17, so that the inertia of the wheel 36 is not transmitted to the turntable as would be the case if the wheel were to brake the turntable alone.

It is preferred that the arm 51 be mounted to pivot in the direction of rotation of the turntable upon being moved to its operative position, whereby the inertia of the turntable will tend to urge the brake 61 toward braking position rather than away therefrom.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a phonograph (a) a rotatable drive spindle, (b) a circular turntable mounted for rotation about an axis spaced from and parallel to the axis of said spindle, and having an axially extending annular flange coaxial of said turntable, (c) a member mounted to pivot about a further axis parallel to said spindle axis, (d) a wheel rotatably mounted on said member to rotate in a plane transverse to said spindle axis, (e) a spring constantly urging said member toward an active position in which the peripheral surface of said wheel is disposed in frictional engagement with said spindle and said annular flange, thereby to transmit the rotation of said spindle to said turntable, and (f) means operable simultaneously to disengage said wheel from said spindle and to halt the rotation of said turntable without stopping said spindle, said means comprising (g) a manually operable three-armed lever mounted at one of its ends to pivot in a plane parallel to the plane of rotation of said wheel between an active and an inactive position, respectively, (h) a brake roller fixed to another end of said lever with its axis extending parallel to said spindle axis, said lever being operative during the movement thereof to its active position to press said brake roller simultaneously into tangential, braking engagement with said annular flange and said wheel, thereby to pivot the first-named member away from its active position against the resistance of said spring.

2. In a phonograph having a rotatable drive spindle and an annularly flanged turntable mounted to rotate about an axis parallel to the axis of rotation of said spindle, means for selectively transmitting the rotation of said spindle to said turntable, comprising (a) a lever mounted for movement transverse to the axis of said spindle between a first and a second position, respectively, (b) a spring connected to said lever and constantly urging it toward said first position, (c) a wheel carried by said lever for rotation about a further axis parallel to said spindle axis, and movable by said lever to an active position in which its peripheral surface is in frictional engagement with the annular flange of said turntable and with said spindle, when said lever is in said first position, (d) a cylindrical brake member, and (e) a manually operable lever mounting said brake member for movement selectively between an inoperative position spaced from said turntable and said wheel, and an operative position in which said brake member is jammed between said wheel and the annular flange of said turntable with its peripheral surface engaging said wheel and said flange, (f) said brake member being operative, upon movement to its operative position, to move the first-named lever to said second position, thereby simultaneously to disengage said wheel from said spindle, and to halt the rotation of said wheel and said turntable, without halting the rotation of said spindle.

3. In a phonograph, (a) a turntable support plate, (b) a turntable rotatably mounted on said plate in axially spaced relation thereto, and having a coaxial annular flange, (c) a drive spindle mounted to rotate about an axis parallel to the axis of rotation of said turntable and having a plurality of axially extending, reduced diameter portions disposed in the axial space between said plate and said turntable, (d) a lever mounted in said axial space for axial movement relative to said spindle and for pivotal movement transverse to said spindle, (e) manually operable cam means connected to said lever and operable to shift said lever axially in said space, (f) a wheel carried by said lever to rotate in said axial space in a plane transverse to said spindle, and movable axially with said lever selectively to align its peripheral surface with said spindle and one of its reduced diameter portions, (g) a spring constantly urging said lever about its pivotal axis in a direction to place said wheel in frictional engagement with both the portion of said spindle aligned therewith and with the inside of said flange, thereby to transmit the rotation of said spindle to said turntable, (h) a brake roller, and (i) means mounting said roller in said axial space for movement between an inactive position in which said roller is spaced from said wheel and said flange, and an active position in which said roller is jammed into braking engagement with said peripheral surface of said wheel and said flange, said roller during movement thereof to its active position being operative to pivot said lever, by engagement with said wheel, against the resistance of said spring thereby to disengage said wheel from said spindle.

4. In a phonograph as defined in claim 3 wherein (a) said mounting means comprises a manually operable lever pivoted to said plate and extending out of said axial space beyond the outer marginal edge of said turntable, and (b) a keeper is secured to said plate to limit the pivotal movement of said lever.

5. In a phonograph, (a) a rotary turntable, (b) means including a friction roller for driving said turntable, (c) a brake member, and (d) means for moving said brake member simultaneously into engagement with said roller and said turntable to brake them both.

6. In a phonograph, (a) a rotary turntable, (b) drive means including a rotary drive spindle, (c) a friction roller movable into and out of engagement with said spindle and with said turntable and operative when engaged with both to transmit rotation from said spindle to said turntable, (d) a rotary brake member, and (e) means for moving said rotary brake member simultaneously into engagement with said turntable and with said roller to brake them both and for simultaneously disengaging said roller from said spindle whereby to stop the drive to said turntable and to stop its rotation, and means operative upon disengagement of said brake member from said turntable and from said roller, to engage said roller with said spindle and with said turntable to cause resumption of rotation of said turntable.

References Cited by the Examiner

UNITED STATES PATENTS

| | | | |
|---|---|---|---|
| 2,290,372 | 7/1942 | Knox et al. | 192—120 |
| 2,325,602 | 8/1943 | Gay | 192—4 |
| 2,925,737 | 2/1960 | Hartman | 74—190 XR |

DON A. WAITE, *Primary Examiner.*